(12) United States Patent
Smetek et al.

(10) Patent No.: US 12,200,170 B2
(45) Date of Patent: Jan. 14, 2025

(54) DEVICE, SYSTEM AND METHOD FOR SELECTING CALLS FOR FORWARDING TO A COMMUNICATION DEVICE

(71) Applicant: MOTOROLA SOLUTIONS, INC., Chicago, IL (US)

(72) Inventors: Mateusz Smetek, Kwasniow Gorny (PL); Elwira Nowiszewska, Kamienna Gora (PL); Jakub Halun, Cracow (PL); Grzegorz Kaplita, Rzeszow (PL); Pawel Jurzak, Cracow (PL); Michal Janda, Cracow (PL); Wojciech Kucharski, Jaworzno (PL); Wojciech Czyrnek, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 301 days.

(21) Appl. No.: 17/634,705

(22) PCT Filed: Aug. 16, 2019

(86) PCT No.: PCT/PL2019/050046
§ 371 (c)(1),
(2) Date: Feb. 11, 2022

(87) PCT Pub. No.: WO2021/034206
PCT Pub. Date: Feb. 25, 2021

(65) Prior Publication Data
US 2022/0337702 A1    Oct. 20, 2022

(51) Int. Cl.
*H04M 3/51* (2006.01)
*H04M 3/436* (2006.01)
(52) U.S. Cl.
CPC ....... *H04M 3/5116* (2013.01); *H04M 3/4365* (2013.01)

(58) Field of Classification Search
CPC .......................... H04M 3/5116; H04M 3/4365
(Continued)

(56) References Cited

U.S. PATENT DOCUMENTS 7,428,301 B1    9/2008    Clawson
7,436,937 B2    10/2008   Clawson
(Continued)

FOREIGN PATENT DOCUMENTS

JP    2003029613 A    1/2003

OTHER PUBLICATIONS

International Search Report mailed Apr. 19, 2021, issued in the corresponding PCT Application No. PCT/PL2019/050046, Filed Aug. 16, 2019.
(Continued)

*Primary Examiner* — Maria El-Zoobi
(74) *Attorney, Agent, or Firm* — PERRY + CURRIER, INC.

(57) ABSTRACT

A device, system and method for selecting calls for forwarding to a communication device is provided. An automated call-answering device answers a plurality of calls associated with an incident. The device assigns, to the plurality of calls, questions associated with the incident, each of the questions assigned to at least two of the plurality of calls. The device asks the questions on the plurality of calls, as assigned. The device receives answers to the questions. The device selects a call to be forwarded to a communication device operated by a human user, the call selected from a group of the plurality of calls where one or more consistent answers were received in response to a given question, the call further selected based on voice attributes of callers in the group of the plurality of calls. The device forwards, to the communication device, the call as selected.

18 Claims, 5 Drawing Sheets

(58) Field of Classification Search
USPC .................................................. 455/404.1
See application file for complete search history.

(56) References Cited

U.S. PATENT DOCUMENTS

| | | | |
|---|---|---|---|
| 7,907,551 | B2 | 3/2011 | Croy et al. |
| 8,417,533 | B2 | 4/2013 | Clawson |
| 9,852,213 | B2 | 12/2017 | Brown et al. |
| 10,264,121 | B2* | 4/2019 | Reddy ..................... G10L 15/26 |
| 10,348,888 | B1 | 7/2019 | Arnold et al. |
| 10,362,168 | B1 | 7/2019 | Pitta Eswara Chandra et al. |
| 10,742,809 | B1* | 8/2020 | Schuler ................... G06F 40/30 |
| 2002/0106059 | A1 | 8/2002 | Kroll et al. |
| 2004/0264672 | A1 | 12/2004 | Paek et al. |
| 2014/0094134 | A1* | 4/2014 | Balthasar ............ H04M 3/5235 |
| | | | 379/47 |
| 2016/0337831 | A1 | 11/2016 | Piett et al. |
| 2018/0278504 | A1 | 9/2018 | Alazraki et al. |

OTHER PUBLICATIONS

Lhoti, Sugandha, "AI to the rescue: 5 ways machine learning can assist emergency situations"—https://hub.packtpub.com/ai-rescue-5-ways-machine-learning-can-assist-emergency-situations/, published Jan. 16, 2018.

* cited by examiner

DEVICE, SYSTEM AND METHOD FOR SELECTING CALLS FOR FORWARDING TO A COMMUNICATION DEVICE

BACKGROUND OF THE INVENTION

Dispatchers at computer-aided dispatch centers, and/or emergency call centers, generally initially speak with callers in emergency calls. The dispatchers may then decide, based on a conversation with a caller, first responders to dispatch in response to the emergency call. However, such a process can be time consuming, and a response to the emergency call may be delayed, depending on how quickly the dispatcher can determine which first responders to dispatch. The process can be further slowed down by a volume of emergency calls that a dispatcher may be managing.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Dispatchers at computer-aided dispatch centers, and/or emergency call centers, generally initially speak with callers in emergency calls. The dispatchers may then decide, based on a conversation with a caller, first responders to dispatch in response to the emergency call. However, such a process can be time consuming, and a response to the emergency call may be delayed, depending on how quickly the dispatcher can determine which first responders to dispatch. The process can be further slowed down by a volume of emergency calls that a dispatcher may be managing.

In particular, when a big incident occurs, dispatchers may receive a lot of phone calls from people and/or callers who want to report it; when all lines are busy this may result in other incidents not being reported and/or callers (who may have key information) getting frustrated and hanging up. Hence, in examples described herein, to better use resources at, for example, a computer-aided dispatch center, and/or another type of call center, an automated call-answering device may answer calls to collect information from callers to determine which calls to forward to communication devices operated by human users, such as dispatch terminals, operated by the dispatchers.

An aspect of the present specification provides a method comprising: answering, by an automated call-answering device, a plurality of calls associated with an incident; assigning, by the automated call-answering device, to the plurality of calls, questions associated with the incident, each of the questions assigned to at least two of the plurality of calls; asking, by the automated call-answering device, the questions on the plurality of calls, as assigned; receiving, by the automated call-answering device, answers to the questions; selecting, by the automated call-answering device, a call to be forwarded to a communication device operated by a human user, the call selected from a group of the plurality of calls where one or more consistent answers were received in response to a given question, the call further selected based on voice attributes of callers in the group of the plurality of calls; and forwarding, from the automated call-answering device to the communication device, the call as selected.

Another aspect of the present specification provides an automated call-answering device comprising: a communication unit; and a controller configured to: answer, via the communication unit, a plurality of calls associated with an incident; assign to the plurality of calls, questions associated with the incident, each of the questions assigned to at least two of the plurality of calls; ask, via the communication unit, the questions on the plurality of calls, as assigned; receive, via the communication unit, answers to the questions; select a call to be forwarded to a communication device operated by a human user, the call selected from a group of the plurality of calls where one or more consistent answers were received in response to a given question, the call further selected based on voice attributes of callers in the group of the plurality of calls; and forward, via the communication unit, to the communication device, the call as selected.

Figure 1:
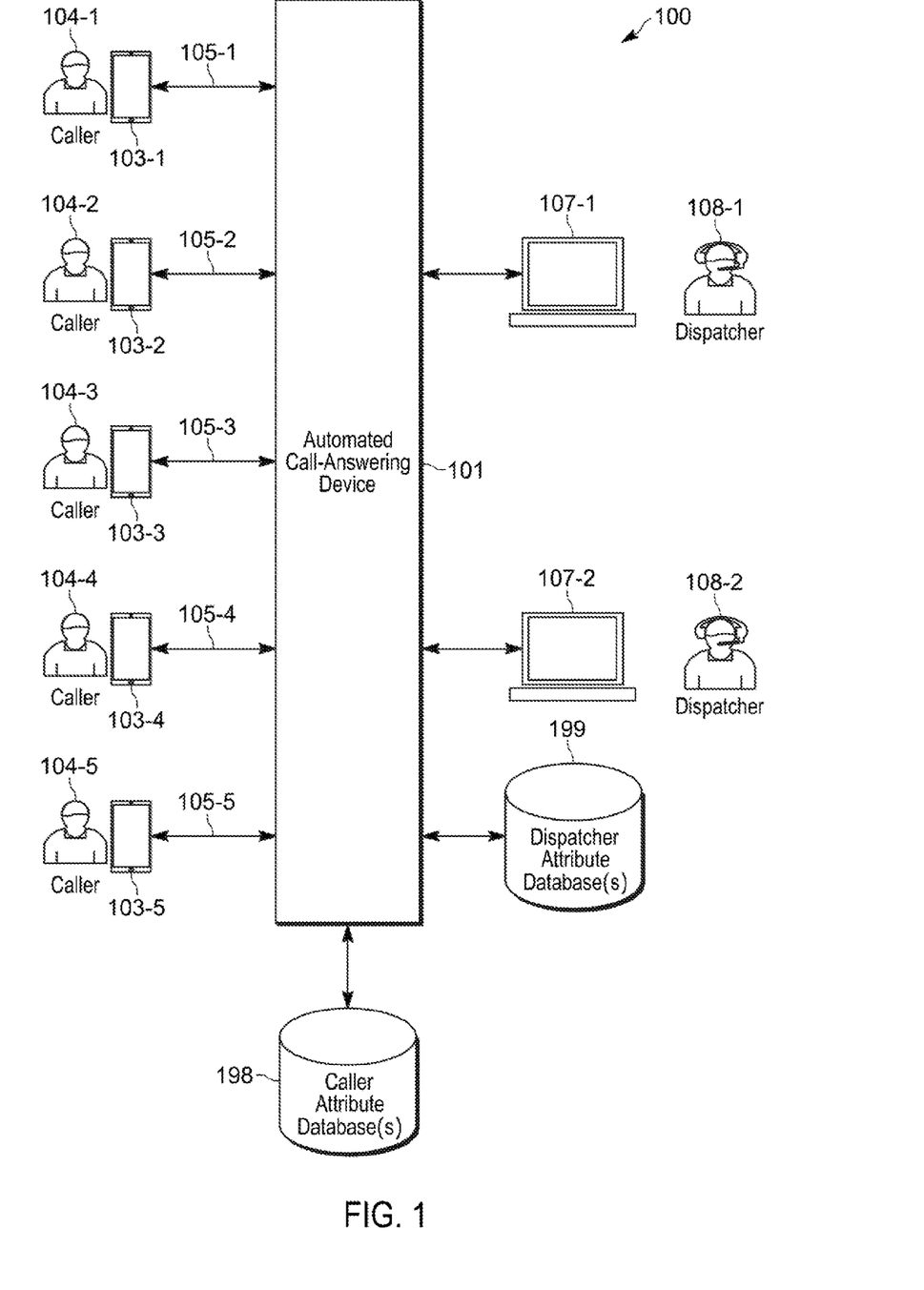
FIG. 1 is a system for selecting calls for forwarding to a communication device, in accordance with some examples.

Attention is directed to FIG. 1, which depicts an example system 100 for selecting calls for forwarding to a communication device. The system 100 comprises an automated call-answering device 101 configured to communicate with a plurality of calling devices 103-1, 103-2, 103-3, 103-4, 103-5, respectively operated by callers 104-1, 104-2, 104-3, 104-4, 104-5. Specifically the automated call-answering device 101 is configured to receive a plurality of calls 105-1, 105-2, 105-3, 105-4, 105-5 from the calling devices 103-1, 103-2, 103-3, 103-4, 103-5, for example a respective call 105-1, 105-2, 105-3, 105-4, 105-5 from each of the depicted calling devices 103-1, 103-2, 103-3, 103-4, 103-5. As depicted, the calling devices 103-1, 103-2, 103-3, 103-4, 103-5 comprise mobile devices, but the calling devices 103-1, 103-2, 103-3, 103-4, 103-5 may comprise any suitable communication devices for making a call to the automated call-answering device 101 including, but not limited to, the depicted mobile devices, public switched telephone network (PSTN) telephones, laptops, personal computers, and the like. Furthermore, the calls 105-1, 105-2, 105-3, 105-4, 105-5 may occur via any suitable wireless or wired network and may include, but are not limited to, mobile phone calls, PSTN calls, Internet Protocol (IP) calls, calls made using applications, and the like.

As depicted, the system 100 further comprises communication devices 107-1, 107-2 in communication with the automated call-answering device 101 via respective communication links. As depicted, the communication devices 107-1, 107-2 may comprise dispatch terminals to which the automated call-answering device 101 forwards at least a portion of the calls 105-1, 105-2, 105-3, 105-4, 105-5. The communication devices 107-1, 107-2 are generally operated by human users, for example, as depicted, respective dispatchers 108-1, 108-2.

The calling devices 103-1, 103-2, 103-3, 103-4, 103-5 are interchangeably referred to hereafter, collectively, as the calling devices 103 and, generically, as a calling device 103. The callers 104-1, 104-2, 104-3, 104-4, 104-5 are interchangeably referred to hereafter, collectively, as the callers 104 and, generically, as a caller 104. The calls 105-1, 105-2, 105-3, 105-4, 105-5 are interchangeably referred to hereafter, collectively, as the calls 105 and, generically, as a call 105. The communication devices 107-1, 107-2 are interchangeably referred to hereafter, collectively, as the communication devices 107 and, generically, as a communication device 107. The dispatchers 108-1, 108-2 are interchangeably referred to hereafter, collectively, as the dispatchers 108 and, generically, as a dispatcher 108.

While five calling devices 103 are depicted in FIG. 1, the system 100 may comprise any suitable number of calling devices 103 and associated callers 104; similarly, while two communication devices 107 are depicted in FIG. 1, the system 100 may comprise any suitable number of communication devices 107 and associated dispatchers 108 and/or human users.

The automated call-answering device 101 may be configured to receive the calls 105, from the calling devices 103 and the like, in association with a public safety answering point (PSAP), a 911 call center, and the like, and select calls 105 for forwarding to one or more of the communication devices 107. For example, a communication device 107 may comprise communication device comprise a terminal of the PSAP, and a human user of a communication device 107 may comprise a dispatcher 108 of the PSAP.

However, while present examples will be described with respect to a PSAP, the automated call-answering device 101 may be configured to receive calls 105 for any suitable type of call center, dispatch center, and the like.

As depicted, for example, each of the calling devices 103 has called a number (e.g. "911") for the PSAP to report an incident, and in particular the same incident. The automated call-answering device 101 automatically receives and/or answers the calls 105 thereby causing communication links between the automated call-answering device 101 and the calling devices 103 to be generated using any suitable combination of wired and/or wireless networks. Communication links between components of the system 100 are depicted in FIG. 1, and throughout the present specification, as double-ended arrows between respective components; the communication links may include any suitable combination of wireless and/or wired links and/or wireless and/or wired communication networks. Hence, for example, communication links between the automated call-answering device 101 and the communication devices 107 are generally established and the automated call-answering device 101 may forward and/or transfer calls 105 from the calling devices 103 to the communication devices 107 over such communication links, as described below.

As will be described hereafter, the automated call-answering device 101 is generally configured to: determine that the calls 105 are associated with an incident; assign and ask at least a question associated with the incident on at least two of the calls 105; receive answers to the questions; determine voice attributes of the callers 104; select a call 105 to be forwarded to a communication device 107, the call 105 selected from a group of the plurality of calls 105 where one or more consistent answers were received in response to a given question, the call 105 further selected based on voice attributes of callers 104 in the group of the plurality of calls; and forward the selected call 105.

The call 105 to be forwarded may be further selected based on associated caller attributes. For example, as depicted, the system 100 further comprises at least one caller attribute database 198 in communication with the automated call-answering device 101. The at least one caller attribute database 198 (interchangeably referred to hereafter as the database 198) may comprise any suitable database and/or memory, and the like, where attributes of the callers 104 are stored including, but not limited to, an electronic telephone book (e.g. which may be used to determine a name of a caller 104 based on a telephone number, and the like, of a calling device 103), police records, medical records, civil records (e.g. records of births, deaths, marriages and the like), social media records (e.g. a database 198 may be operated by, and/or associated with, a social media platform), education records, professional records, work history records, and the like.

As depicted, the system 100 further comprises at least one dispatcher attribute database 199, and the like, in communication with the automated call-answering device 101. The at least one dispatcher attribute database 199 (interchangeably referred to hereafter as the database 199) may comprise any suitable database and/or memory, and the like, where attributes of the dispatchers 108 are stored including, but not limited to, background information, training, education, and the like of the dispatchers 108. For example, the database 199 may indicate that an attribute of the dispatcher 108-1 is that the dispatcher 108-1 has a background in fire incidents and/or fire emergency services; similarly, the database 199 may indicate that an attribute of the dispatcher 108-2 is that the dispatcher 108-2 has a background in medical services. The data stored at the database 199 may be used by the automated call-answering device 101 to determine a communication device 107 to forward calls 105.

Figure 2:
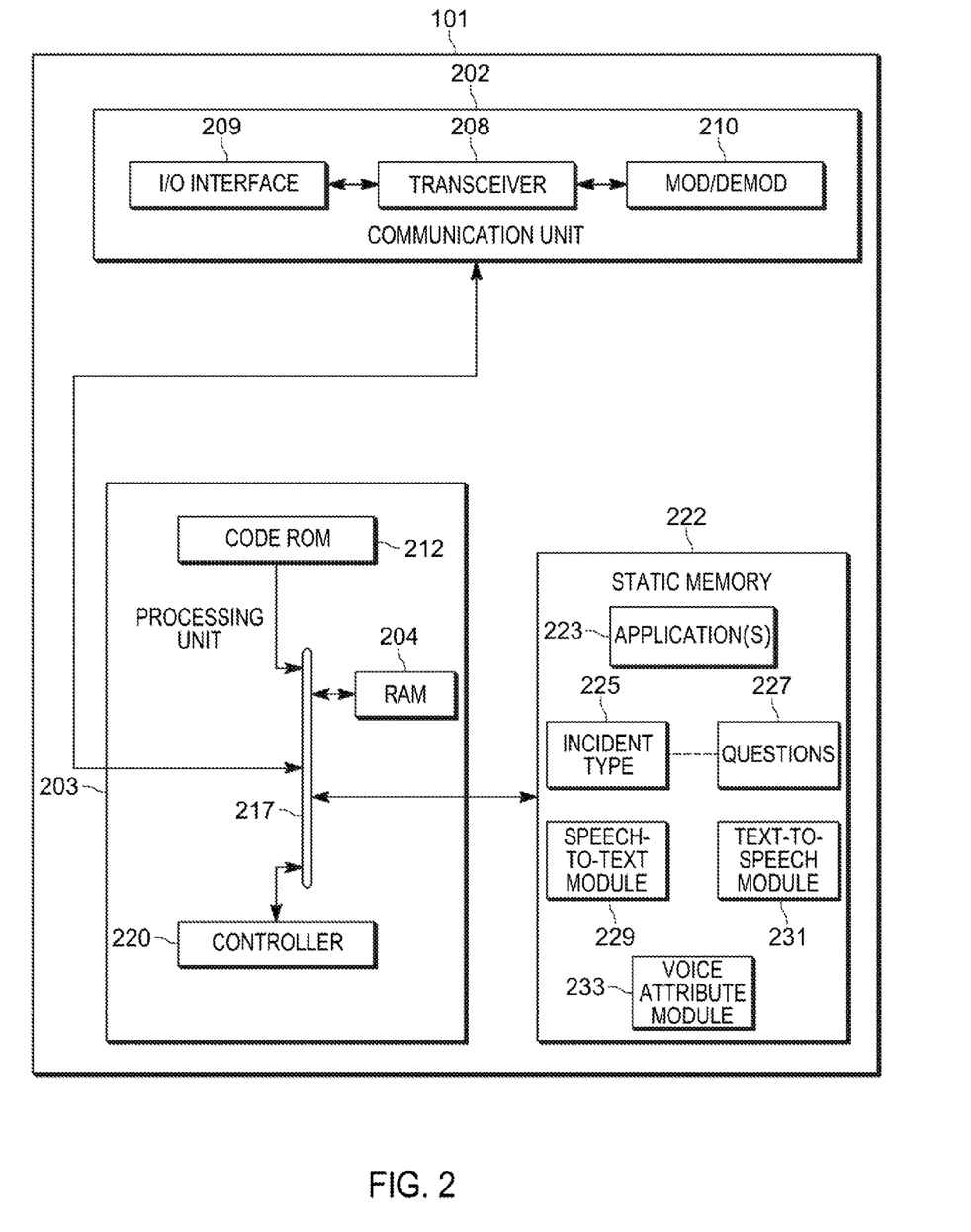
FIG. 2 is a device diagram showing a device structure of an automated call-answer device for selecting calls for forwarding to a communication device, in accordance with some examples.

Attention is next directed to FIG. 2 which depicts a schematic block diagram of an example of the automated call-answering device 101. In general, the automated call-answering device 101 may comprise one or more servers and/or one or more cloud computing devices, and the like, configured to communicate with the calling devices 103 and the communication devices 107. However, the automated call-answering device 101 may comprise a computing device such as a personal computer and/or a laptop computer, and the like. In some examples, the automated call-answering device 101 may be combined with one or more of the communication devices 107. The automated call-answering device 101 may be located at a PSAP, and the like, and/or remote from a PSAP, and the like. Similarly, the automated call-answering device 101 may be located at a same facility (e.g. a PSAP) as the communication devices 107, and the like, and/or the automated call-answering device 101 and the communication devices 107 may be remote from each other; indeed, one or more of the communication devices 107 may be remote from a PSAP, and the like.

As depicted, the automated call-answering device 101 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the automated call-answering device 101 may include one or more of an input device and a display screen and the like, a microphone (e.g. to receive voice commands) such that a user, such as one or more of the dispatchers 108, may interact with the automated call-answering device 101. However, a user, such as one or more of the dispatchers 108, may interact with the automated call-answering device 101 via a respective communication device 107.

As shown in FIG. 2, the automated call-answering device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with the calling devices 103 and the communication devices 107. For example, the communication unit 202 may include one or more transceivers 208 and/or wireless transceivers for communicating with the calling devices 103 and/or the communication devices 107. Hence, the one or more transceivers 208 may be adapted for communication with one or more communication networks used to communicate with the calling devices 103 and/or the communication devices 107. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the automated call-answering device 101 is not a generic controller and/or a generic device, but a device specifically configured to implement functionality for selecting calls for forwarding to a communication device. For example, in some examples, the automated call-answering device 101 and/or the controller 220 specifically comprises a computer executable engine configured to implement functionality for selecting calls for forwarding to a communication device.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the automated call-answering device 101 as described herein are maintained, persistently, at the memory 222 and used by the controller 220 which makes appropriate utilization of volatile storage during the execution of such programming instructions.

As depicted, the memory 222 further stores an incident type 225 (e.g. an incident type identifier) in association with questions 227; associations between such components are indicated in FIG. 2, and throughout the present specification, as dashed lines therebetween. The questions 227 comprise one or more questions to be asked by the automated call-answer device 101 and/or the controller 220 while implementing the application 223. While the memory 222 is depicted as storing one incident type 225 and associated questions 227, the memory 222 may store a plurality of incident types 225 and associated questions 227. The questions 227 may be generally preconfigured and/or predetermined for each incident type 225; for example, when the incident type 225 is for a fire incident, the questions 227 may be for determining information about a fire (e.g. "Where is the fire?", "Are there any injuries?", etc.). Different questions 227 may be configured for different incident types 225.

Put another way, questions 227 associated with an incident may be one or more of: predetermined; and stored at a memory (e.g. the memory 222 and/or another memory), accessible to the automated call-answering device 101, in association with the incident type 225.

Furthermore, in some examples, there may be a minimum number of questions for an incident type; for example, in some examples, there are at least six questions for the incident type 225.

While not depicted, the memory 222 may store other types of questions and/or text to be asked on the calls 105, including, but not limited to, one or more initial questions to be asked on a call 105 for determining an incident type, and/or attributed of a caller 104, and the like (e.g. "Hello, what type of incident are you calling about?", "What is your name?" "Where are you calling from?", etc.).

As depicted, the memory 222 further stores a speech-to-text module 229 and a text-to-speech module 231, which may be used by the automated call-answer device 101 and/or the controller 220 while implementing the application 223. The speech-to-text module 229 may be to convert speech and/or answers (e.g. as received on a call 105) to text, and the text-to-speech module 231 may be to convert text (e.g. of a question 227) to speech such that a question 227 may be asked on a call 105.

As depicted, the memory 222 further stores a voice attribute module 233, which may be used by the automated call-answer device 101 and/or the controller 220 while implementing the application 223. The voice attribute module 233 may be to determine an emotion of caller 104, for example by determining and/or analyzing frequency patterns of speech and/or answers received on a call 105. In some examples, the voice attribute module 233 may comprise a spectrum analyzer, and the like. In alternative examples, the automated call-answer device 101 may comprise a spectrum analyzer device having the above described functionality provided by the voice attribute module 233.

Use of the incident type 225, the associated questions 227, and the modules 229, 231, 233 are described in further detail below. While the incident type 225, the associated questions 227, and the modules 229, 231, 233 are depicted as separate from the application 223, in other examples one or more of the incident type 225, the associated questions 227, and the modules 229, 231, 233 may be components of the application 223.

Figure 3:
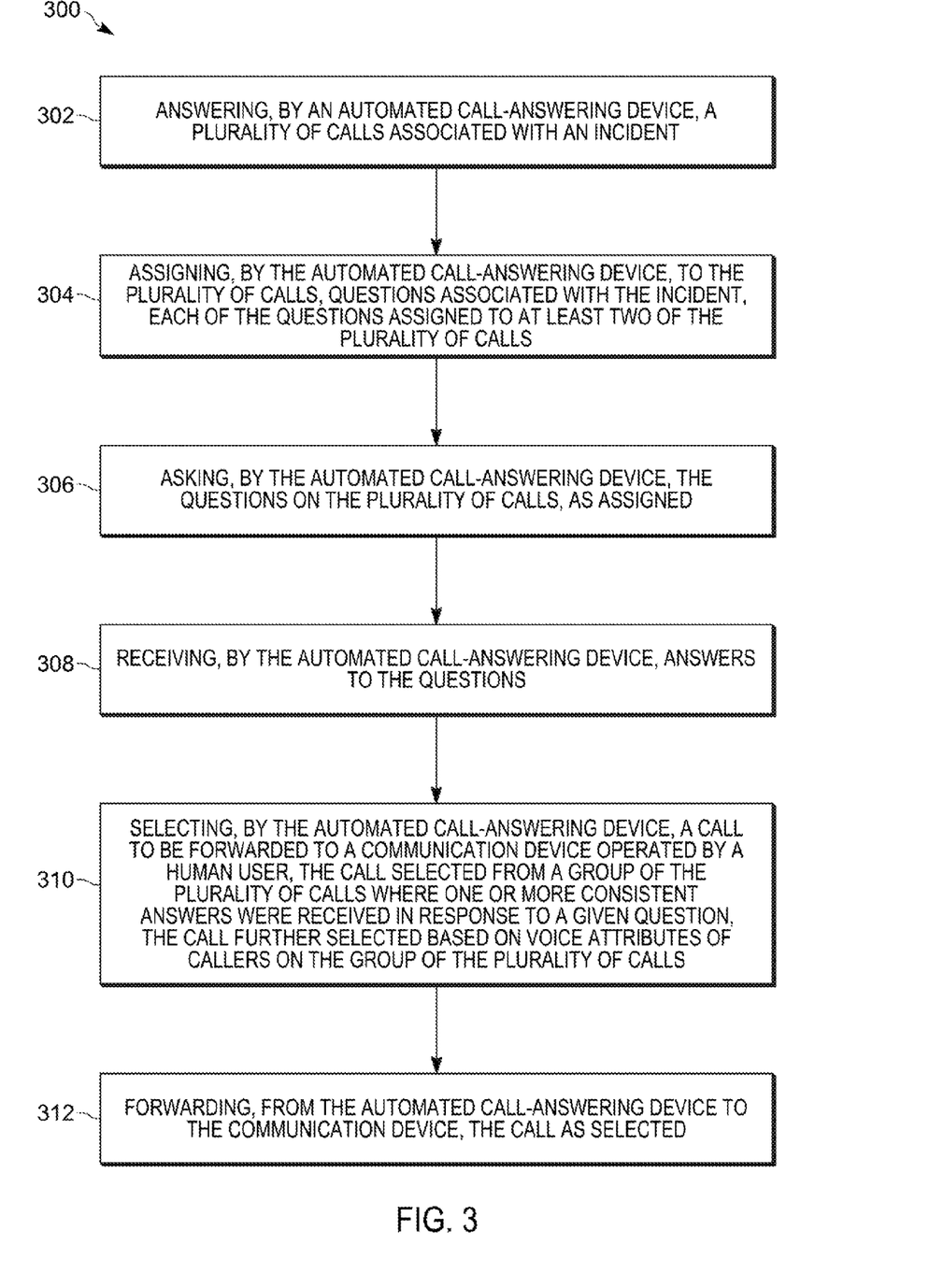
FIG. 3 is a flowchart of a method for selecting calls for forwarding to a communication device, in accordance with some examples.

In particular, the memory 222 stores instructions corresponding to the at least one application 223 (and which may include, but are not limited to the incident type 225, the associated questions 227, and the modules 229, 231, 233) that, when executed by the controller 220, enables the controller 220 to implement functionality for selecting calls 105 for forwarding to a communication device 107 including, but not limited to, the blocks of the method set forth in FIG. 3.

In illustrated examples, when the controller 220 executes the one or more applications 223, the controller 220 is enabled to: answer a plurality of calls 105 associated with an incident (e.g. received from the calling devices 103); assign to the plurality of calls 105, questions 227 associated with the incident, each of the questions assigned to at least two of the plurality of calls 105; ask the questions 227 on the plurality of calls 105, as assigned; receive answers to the questions 227; select a call 105 to be forwarded to a communication device 107 operated by a human user (e.g. a dispatcher 108), the call 105 selected from a group of the plurality of calls 105 where one or more consistent answers were received in response to a given question 227, the call 105 further selected based on voice attributes of callers 104 in the group of the plurality of calls 105; and forward, to the communication device 107, the call 105 as selected.

The application 223 (and/or the module 233) may include numerical algorithms to determine that the calls 105 are associated with an incident, determine an incident type, assign the questions 227 to the calls 105, select consistent and/or contradictory answers to a question 227, determine voice attributes of a caller 104, select a call 105 to be forwarded to a communication device 107 based on answers to the questions 227, and/or determine associated caller attributes.

Alternatively, the application 223 may include machine learning and/or deep-learning based algorithms and/or neural networks, and the like, which have been trained to determine that the calls 105 are associated with an incident, determine an incident type, assign the questions 227 to the calls 105 select consistent and/or contradictory answers to a question 227, determine voice attributes of a caller 104, select a call 105 to be forwarded to a communication device 107 based on answers to the questions 227, and/or determine associated caller attributes. Furthermore, in these examples, the application 223 may initially be operated by the controller 220 in a training mode to train the machine learning and/or deep-learning based algorithms and/or neural networks of the application 223 to determine that the calls 105 are associated with an incident, determine an incident type, assign the questions 227 to the calls 105, select consistent and/or contradictory answers to a question 227, determine voice attributes of a caller 104, select a call 105 to be forwarded to a communication device 107 based on answers to the questions 227, and/or determine associated caller attributes.

The one or more machine learning algorithms and/or deep learning algorithms and/or neural networks of the application 223 may include, but are not limited to: a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments, such as a 911 call center. Any suitable machine learning algorithm and/or deep learning algorithm and/or neural network is within the scope of present examples.

While details of the calling devices 103 and the communication devices 107 are not depicted, the calling devices 103 and the communication devices 107 may have components similar to the automated call-answering device 101 adapted, however, for the functionality of the calling devices 103 and the communication devices 107. For example, the calling devices 103 and/or the communication devices 107 may include respective display screens, speakers, microphones, location determining devices (e.g. Global Positioning System (GPS) devices), and the like. In some examples, the calling devices 103 may provide metadata to the automated call-answering device 101 on a call 105, for example caller attributes such as a phone number, a network identifier, a location, and the like, which may be used to look up information and/or further caller attributes of a caller 104 in the database 198.

Attention is now directed to FIG. 3 which depicts a flowchart representative of a method 300 for selecting calls for forwarding to a communication device. The operations of the method 300 of FIG. 3 correspond to machine readable instructions that are executed by the automated call-answering device 101, and specifically the controller 220 of the automated call-answering device 101. In the illustrated example, the instructions represented by the blocks of FIG. 3 are stored at the memory 222 for example, as the application 223. The method 300 of FIG. 3 is one way in which the controller 220 and/or the automated call-answering device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the automated call-answering device 101 answers (e.g. via the communication unit 202) a plurality of calls 105 associated with an incident (e.g. received from the calling devices 103). For example, the callers 104 may witness an incident, such as a fire, and call "911", and the like, to report the incident to a PSAP; in the system 100, and such calls 105 may be answered by the automated call-answering device 101. Hence, the automated call-answering device 101 receives the calls 105.

At the block 302, the controller 220 and/or the automated call-answering device 101 may ask one or more initial questions on the calls 105, for example by using the text-to-speech module 231, to determine a type of the incident being reported, a name of a caller 104, a location of caller 104, and the like, and determine the type of incident using the speech-to-text module 229 to recognize an incident type from the answers received on the calls 105. For example, the word "fire" may be used in the answers, as well as a reference to a geographic location and/or area where the fire is occurring. From such answers, the controller 220 and/or the automated call-answering device 101 may determine that the incident type of the calls 105 is a "fire" incident type (e.g. the incident type 225), and that the calls 105 are associated with an incident of a fire at the geographic location and/or area indicated in the answers.

At a block 304, the controller 220 and/or the automated call-answering device 101 assigns to the plurality of calls 105, questions 227 associated with the incident, each of the questions 227 assigned to at least two of the plurality of calls 105. The questions 227 may be selected by determining the incident type 225 as described above, and selecting the questions 227 associated with the incident type 225 from the memory 222. In some examples, a question 227 may be randomly assigned to at least two of the plurality of calls 105.

In some examples, the controller 220 and/or the automated call-answering device 101 may the questions 227 associated with the incident to the plurality of calls 105 at least partially based on answers to previously asked questions 227 (e.g. such asking of questions 227 is described below). For example, a caller 104 may answer a first question 227 which indicates their expertise and/or skill in a paramedic and/or medical profession and/or field, and a second question 227 may be assigned to the call 105, over which the caller 104 is communicating, that is associated with related to medical conditions of victims In other examples, the controller 220 and/or the automated call-answering device 101 may assign a question 227 to at least two of the plurality of calls 105 based at least partially on associated caller attributes which may be determined based on information spoken by a caller 104 on a call 105 and/or answers to initial questions asked on a call 105 and/or answers to the questions 227 and/or metadata received with a call 105 and/or data retrieved from the database 198. For example, the controller 220 and/or the automated call-answering device 101 may determine a name of a caller 104 and look up the name in the database 198 to determine an education and/or profession of the caller 104; when the caller 104, for example, has a paramedic and/or medical education and/or profession (e.g. the caller 104 is a paramedic), a question 227 related to medical conditions of victims may be asked on the call 105 over which the caller 104 is communicating. Hence, in some examples, the associated caller attributes may comprise a skill of a respective caller and/or an expertise of a respective caller.

In other examples, a victim of the incident may be determined (e.g. on one or more of the calls 105 and/or as reported to the PSAP by a first responder, and the like), and a relationship (e.g. a family relationship) between the victim and a caller 104 may be determined. A question 227 associated with victims may be assigned to call 105 based on the determined relationship (e.g. "Do you know an address of a victim?"). Indeed, any suitable type of associated caller attribute may be determined and used to determine a question 227 to be assigned to a caller 104.

Any suitable associated caller attributes are within the scope of the present specification. For example, associated caller attributes may include, but are not limited to, one or more of:

Data stored in one or more memories (e.g. the database 198) accessible to the automated call-answering device 101, the data associated with the respective caller 104.

A name of a respective caller 104 on the plurality of calls 105, which may be used to look up information at the database 198 about the respective caller 104 in the database 198 to determine a question 227 to ask the respective caller 104.

A phone number of the respective caller 104, which may be used to look up information about the respective caller 104 at the database 198 to determine a question 227 to ask the respective caller 104; the phone number may be used similar to the name of the caller 104.

A location of the respective caller 104, which may be used to determine a question 227 to ask the respective caller 104 that relates to location of the incident and/or to determine that the respective caller 104 is closer to the incident than another caller 104, and hence may have more accurate information to provide in an answer; the location may be determined based on metadata received on a call 105 and/or based on information provided by the respective caller 104 on a call 105.

A time that a respective call 105 from the respective caller 104 was received; for example, the respective call 105 may be received closer to a determined time of the incident and hence the respective caller 104 may know information related to how the incident began, and a suitable question 227 may be assigned accordingly (e.g. "Do you know how the fire started?").

A relationship of the respective caller 104 to a person associated with the incident, as described above.

A respective voice attribute of the respective caller 104; for example, the voice attribute module 233 may be used by the controller 220 and/or the automated call-answering device 101 to determine whether the respective caller 104 is calm or panicked and if calm, a more complex question 227 may be assigned and/or, if panicked, a less complex question 227 may be assigned.

One or more of a skill associated with a respective caller 104 and an expertise associated with a respective caller 104. Such information may be stored at the database 198, and the like, however, such a skill associated with a respective caller 104 and/or an expertise associated with a respective caller 104 may be determined via keywords spoken by a respective caller 104 on a call 105 (e.g. "I am a paramedic").

At a block 306, the controller 220 and/or the automated call-answering device 101 asks (e.g. via the communication unit) the questions 227 on the plurality of calls 105, as assigned. For example, the controller 220 and/or the automated call-answering device 101 may use the text-to-speech module 231 to ask the assigned questions 227 on the calls 105, for example to convert received text of the questions 227 to speech to ask on the calls 105.

At a block 308, the controller 220 and/or the automated call-answering device 101 receives (e.g. via the communication unit 202) answers to the questions. For example, the controller 220 and/or the automated call-answering device 101 may use the speech-to-text module 229 to receive the answers on the calls 105, for example to convert speech received on the calls 105, indicating the answers, to text.

At a block 310, the controller 220 and/or the automated call-answering device 101 selects a call 105 to be forwarded to a communication device 107 operated by a human user (e.g. a dispatcher 108), the call 105 selected from a group of the plurality of calls 105 where one or more consistent answers were received in response to a given question 227, the call 105 (e.g. to be forwarded) further selected based on voice attributes of callers 104 in the group of the plurality of calls 105.

For example, the controller 220 and/or the automated call-answering device 101 may determine the group of the plurality of calls 105 where one or more consistent answers were received in response to a given question 227 by comparing the text of answers to the questions 227 asked on the calls 105.

The controller 220 and/or the automated call-answering device 101 may determine voice attributes of callers 104 in the group of the plurality of calls 105 using the voice attribute module 233, for example to determine an emotion and/or an emotional state a caller 104 (e.g. whether a caller 104 is calm or panicked, and the like). In particular, the voice attributes of the callers 104 of the group of the plurality of calls 105 may comprise respective frequency patterns received in the group of the plurality of calls 105; for example, the respective frequency patterns may be associated with different emotions and/or emotional states, which may be used to determine emotions and/or emotional states of the callers 104 in the group. Hence, the voice attributes of the callers 104 may alternatively comprise emotional attributes and/or emotional states of a voice of a caller 104.

Alternatively, the voice attributes of callers 104 in the group of the plurality of calls 105, determined by the controller 220 and/or the automated call-answering device 101, may comprise keywords detected in the group of the plurality of calls 105. For example, one caller 104 may use keywords associated with being calm (e.g. "Hey just calling to report a fire"), and another caller 104 may use keywords associated with being panicked (e.g. "There's a huge fire and I don't know what to do, help!").

Hence, for example, when a question 227 is asked twice on the calls 105, and two callers 104 provide consistent answers, but one of the callers 104 is calm and the other is panicked, the call 105 of the calm caller 104 may be selected for forwarding to a communication device 107. However, any suitable process for selecting a caller 104 based on voice attributes is within the scope of the present specification; for example all callers 104 may be panicked but one of the callers 104 may be less panicked than others, and a call 105 of the less panicked caller 104 may be selected for forwarding.

In some examples, the controller 220 and/or the automated call-answering device 101 may randomly select a communication device 107 to which to forward the selected call 105 and/or the controller 220 and/or the automated call-answering device 101 may select a communication device 107 to which to forward the selected call 105 based on availability and/or a call queue size of the communication devices 107.

Alternatively, the controller 220 and/or the automated call-answering device 101 may select the communication device 107 from a plurality of communication devices 107 operated by respective human users, based on comparing respective attributes of the respective human users (e.g. the dispatchers 108) to a type of the given question 227 for which consistent answers were received and which lead to the selection of the call 105 at the block 310.

For example, the given question 227 may be related to medicine and/or victims, and a dispatcher 108 may have a medical background, as determined using the database 199; hence, the call 105 selected at the block 310 may be forwarded to a communication device 107 operated by the dispatcher 108 having a medical background. However, any suitable attributes of the dispatchers 108 and/or human users of the communication devices 107 may be used to select a communication device 107 to which to forward the selected call 105.

However, any suitable attributes of the respective human users (e.g. the dispatchers 108) of the communication devices 107 may be used to select a communication device 107 including, but not limited to, fatigue, workload, experience, and the like of the human users and/or using any other suitable criteria. For example, calls 105 having answers to questions 227 associated with urgency and/or a given critical level may be assigned to communication devices 107 of dispatchers 108 with the most experience, and the like. Determination of fatigue of a dispatcher 108 may occur by the controller 220 and/or the automated call-answering device 101 monitoring speech of a dispatcher 108 via the voice attribute module 233.

At a block 312, the controller 220 and/or the automated call-answering device 101 forwards (e.g. via the communication unit 202), to the communication device 107, the call 105 as selected. A dispatcher 108 operating the communication device 107 may then speak to the caller 104 (e.g. the calmer caller 104) on the forwarded call 105 to determine more information about the incident. The dispatcher 108 may then accordingly dispatch suitable first responders to the scene of the incident.

In some examples, the controller 220 and/or the automated call-answering device 101 may further assign questions to calls 105 based on received answers.

For example, the method 300 may further comprise the controller 220 and/or the automated call-answering device: when received answers to a given question 227 contradict each other, the given question 227 asked on a first call 105 and a second call 105 of the plurality of calls 105, asking the given question 227 on at least a third call 105 of the plurality of calls. Hence, in these examples, a given question 227 is assigned to the calls 105 three times in an attempt to sort out which of two contradictory answers may be correct, and/or to determine the group of calls 105 of the block 310 and/or to identify two groups of the plurality of calls 105 where different respective answers were received in response to a given question 227, and the like.

In yet further examples, when received answers to a given question 227 contradict each other, for example when the given question 227 is asked on a first call 105 and a second call 105, the given question 227 may be asked again and/or repeated on one or more the first call 105 and the second call 105. Follow-up received answers to the given question 227 asked again and/or repeated on one or more the first call 105 and the second call 105 may clarify why the initial received answers contradicted each other.

In some examples, the controller 220 and/or the automated call-answering device 101 may further select calls 105 for forwarding based on answers to a question being different and/or contradictory.

For example, the method 300 may further comprise the controller 220 and/or the automated call-answering device: identifying two groups of the plurality of calls 105 where different respective answers were received in response to a given question 227; selecting a respective call 105 from each of the two groups based on respective voice attributes of the callers 104 on the two groups of the plurality of calls 105 (e.g. a call 105 having a calmest caller 104 is selected from each of the two groups); and forwarding, from the automated call-answering device 101 to a communication device 107 operated by a human user, the respective call 105 from each of the two groups. Hence, in these examples, the calls 105 may be grouped by answers to a given question 227, and one call from each group is selected for forwarding to a communication device 107, for example the same communication device 107, so that the associated dispatcher 108 may ask more detailed follow-up questions and determine which of the different answers is correct and/or if yet another answer is correct.

Figure 4:
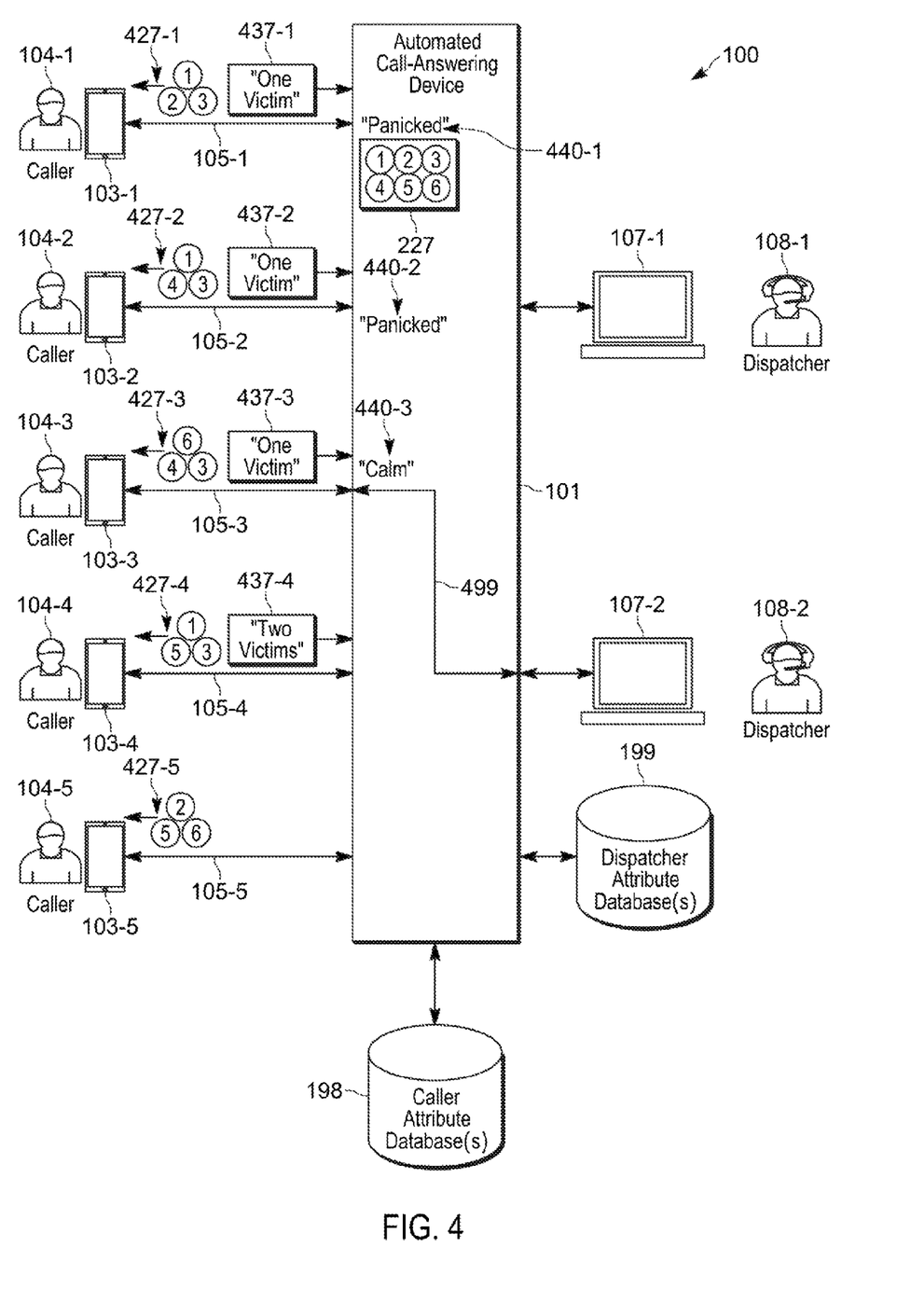
FIG. 4 depicts an example of a method for selecting calls for forwarding to a communication device implemented in the system of FIG. 1, in accordance with some examples.

Attention is now directed to FIG. 4 depicts an example of the method 300 FIG. 4 is substantially similar to FIG. 1 with like components having like numbers. As depicted, the automated call-answering device 101 has received five calls 105 (e.g. at the block 302 of the method 300) and determined that the five calls 105 are associated with a same incident of the incident type 225 (e.g. a fire). As such, the automated call-answering device 101 has retrieved the questions 227 from the memory 222. As depicted, there are six questions 227, depicted in FIG. 4 as "1", "2", "3", "4", "5" and "6" in circles. Specific questions 227 will be referred to hereafter as "Question 1", "Question 2", "Question 3", "Question 4", "Question 5", "Question 6".

The automated call-answering device 101 assigns the questions 227 to the calls 105 (e.g. at the block 304 of the method 300) such that each of the questions 227 are assigned to at least two of the plurality of calls 105. In some examples, the automated call-answering device 101 may assign questions 227 to the calls 105 in a round-robin fashion and/or count a number of times a question 227 is assigned to the calls 105, continuing until each question 227 is assigned to at least two of the calls 105.

As depicted, subsets 427-1, 427-2, 427-3, 427-4, 427-5 (interchangeably referred to hereafter, collectively, as the subsets 427 and, generically as a subset 427) are respectively assigned to the calls 105. For example, the subset 427-1 assigned to the call 105-1 includes Question 1, Question 2, and Question 3 of the questions 227, the subset 427-2 assigned to the call 105-2 includes Question 1, Question 3, and Question 4fvpice of the questions 227, etc.

As described above, the questions 227 may be assigned based on caller attributes which may be determined via the database 198 and/or using keywords received on a call 105. For example, the automated call-answering device 101 may determine that the caller 104-1 is a relative of a victim of the incident and ask a question 227 associated with victims.

As depicted, the automated call-answering device 101 has assigned Question 3 of the questions 227 to the calls 105-1, 105-2, 105-3, 105-4 (e.g. Question 3 is in the subsets 427-1, 427-2, 427-3, 427-4). In the depicted example, the automated call-answering device 101 asks (e.g. at the block 306 of the method 300) questions 227 in the subsets 427 on the respective calls 105, in any suitable order, and waits for a respective answer.

The automated call-answering device 101 responsively receives (e.g. at the block 308 of the method 300) answers 437-1, 437-2, 437-3, 437-4 (interchangeably referred to hereafter, collectively, as the answers 437 and, generically as an answer 437) to the questions 227 in the subsets 427; specifically, in the depicted example the answers 437 are for Question 3 of the questions 227, and hence the depicted answers 437 are received on the calls 105-1, 105-2, 105-3, 105-4. While answers to other questions 227 asked on the calls 105-1, 105-2, 105-3, 105-4 are not depicted, answers to the other calls are understood to be received. While no answers are depicted as being received on the call 105-5 (e.g. as Question 3 is not asked on the call 105-5), answers to questions 227 asked on the call 105-4 will be generally be received at the automated call-answering device 101.

As depicted, the automated call-answering device 101 determines that three of the answers 437-1, 437-2, 437-3 to Question 3 are consistent. For example, Question 3 may be "How many victims are there?" and the answers 437-1, 437-2, 437-3 all indicate "One Victim" while the answer 437-4 indicates "Two Victims". Hence, the automated call-answering device 101 determines that the group of calls 105-1, 105-2, 105-3 are a group of the plurality of calls 105 where consistent answers were received.

As depicted, the automated call-answering device 101 determines voice attributes 440-1, 440-2, 440-3 (interchangeably referred to hereafter, collectively, as the voice attributes 440 and, generically as a voice attribute 440) of the callers 104-1, 104-2, 104-3 in the group of calls 105-1, 105-2, 105-3, for example using the voice attribute module 233 and the like.

As depicted, the automated call-answering device 101 has determined that the callers 104-1, 104-2, 104-3 have respective voice attributes 440 of "Panicked", "Panicked" and "Calm". As the caller 104-3 is calm, and the other callers 104-1, 104-2 are panicked, the automated call-answering device 101 selects (e.g. at the block 310 of the method 300) the call 105-3 for forwarding to a communication device 107.

As depicted, the automated call-answering device 101 forwards (e.g. at the block 312) the call 105-3 to the communication device 107-2, as indicated by a connection 499 in FIG. 4 between the call 105-3 and the communication device 107-2. While the connection 499 is depicted as being via the automated call-answering device 101, the connection 499 may be via any suitable network and may not be via the automated call-answering device 101.

In some examples, the automated call-answering device 101 may communicate with the database 199 to determine respective attributes of the dispatchers 108 and compare a type of the Question 3 to the respective attributes, to determine to which of the communication devices 107 to forward the call 105-3. For example, as Question 3 is type pertaining to victims, and as the dispatcher 108-2 may have a background in medical services, the call 105-3 may be forwarded (e.g. as depicted) to the communication device 107-2 so that the dispatcher 108-2 may speak with the caller 104-3 and determine more information about the victims and/or the incident.

In some examples, the questions 227 and the answers 437 are provided to the communication device 107-2 (e.g. as text) so that the dispatcher 108-2, and rendered at a display screen thereof, so that the dispatcher 108-2 has an overview of the answers 437 received to the questions 227.

As depicted, the answers 437-1, 437-2, 437-3 to Question 3 are consistent, and the answer 437-4 is inconsistent with, and/or contradicts, the answers 437-1, 437-2, 437-3. In some examples, Question 3 may be asked a first time on the call 105-1 and asked a second time on the call 105-4. As the answers 331-1, 437-2 contradict each other and/or are inconsistent, the automated call-answering device 101 may ask Question 3 at least a third time, for example on the call 105-2 and/or on the call 105-3 (and/or on the call 105-5, not depicted) and/or until a given number of consistent answers are received. Hence, in FIG. 4, when received answers 437 to a given question 227 (e.g. Question 3) contradict each other, the given question 227 asked on a first call 105-1 and a second call 105-4 of the plurality of calls 105, the automated call-answering device 101 may ask the given question 227 on at least a third call 105-2, 105-3 of the plurality of calls 105, and/or until a given number of consistent answers 437 to the given question 227 are received.

Figure 5:
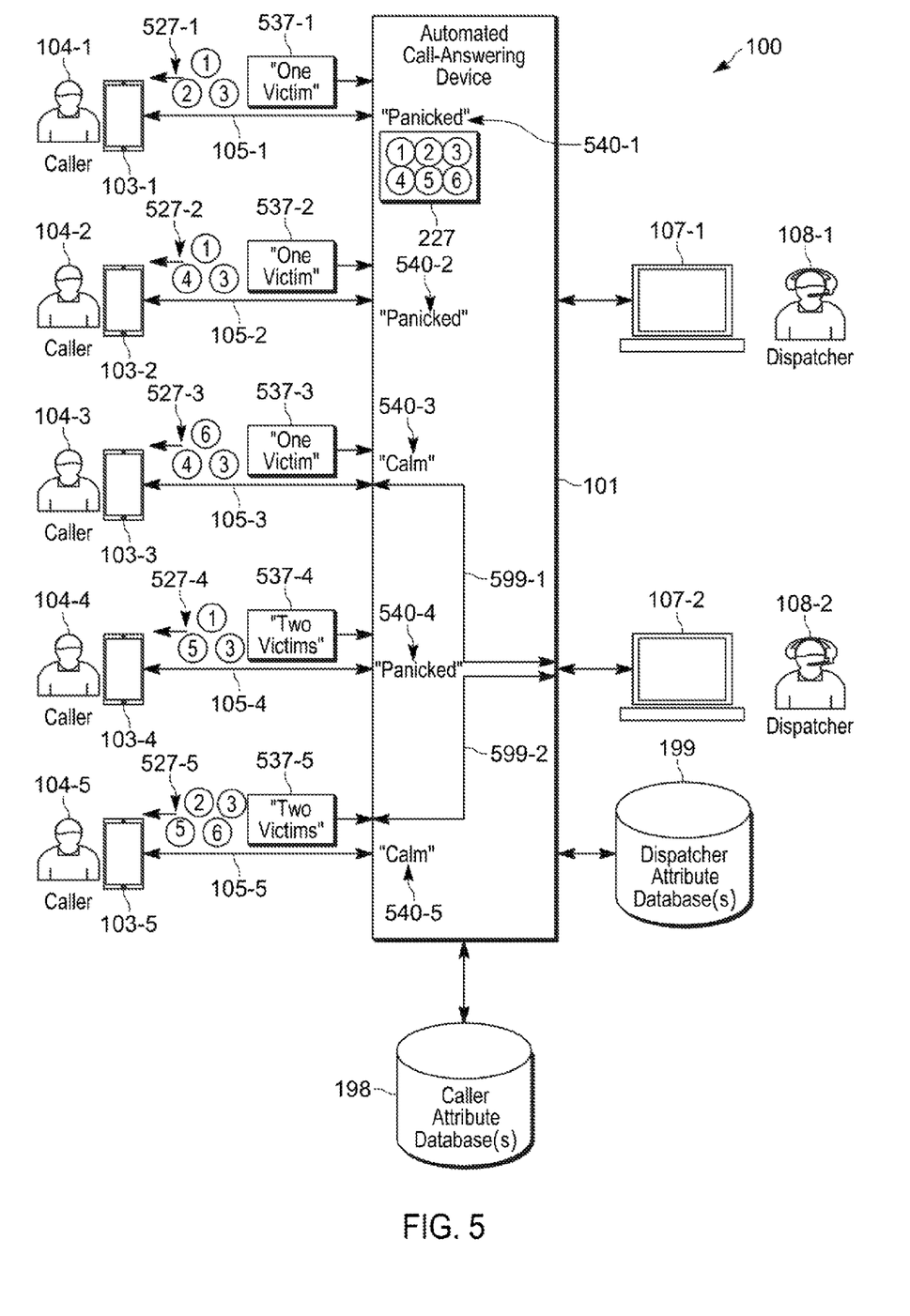
FIG. 5 depicts another example of a method for selecting calls for forwarding to a communication device implemented in the system of FIG. 1, in accordance with some examples.

Attention is next directed to FIG. 5 which depicts another example of the method 300, and is substantially similar to FIG. 4 with like components having like numbers. In FIG. 5, the automated call-answering device 101 respectively assigns subsets 527-1, 527-2, 527-3, 527-4, 527-5 (interchangeably referred to hereafter, collectively, as the subsets 527 and, generically as a subset 527) to the calls 105, similar to as described above with reference to FIG. 4. However, in FIG. 5, Question 3 is also assigned to the call 105-5, and answers 537-1, 537-2, 537-3, 537-4, 537-5 (interchangeably referred to hereafter, collectively, as the answers 537 and, generically as an answer 537) to Question 3 are received at the automated call-answering device 101 on the calls 105-1, 105-2, 105-3, 105-4, 105-5.

In these examples, the automated call-answering device 101 identifies two groups of the plurality of calls 105 where different respective answers 537 were received in response to a given question 227 (e.g. Question 3). For examples, the answers 537-1, 537-2, 537-3 received on a first group of calls 105-1, 105-2, 105-3 indicate "One Victim", and the answers 537-4, 537-5 received on a second group of calls 105-4, 105-5 indicate "Two Victims".

The automated call-answering device 101 selects a respective call 105 from each of the two groups based on respective voice attributes 540-1, 540-2, 540-3, 540-4, 540-5 (interchangeably referred to hereafter, collectively, as the voice attributes 540 and, generically as a voice attribute 540) of the callers 104 on the two groups of the plurality of calls 105.

As depicted, the automated call-answering device 101 has determined that the callers 104-1, 104-2, 104-3 of the first group have respective voice attributes 540 of "Panicked", "Panicked" and "Calm", and the callers 104-4, 104-5 of the second group have respective voice attributes 540 of "Panicked", and "Calm". As the caller 104-3 of the first group is calm, and the other callers 104-1, 104-2 are panicked, and as the caller 104-5 of the second group is calm, and the other caller 104-4 is panicked, the automated call-answering device 101 the calls 105-3 from the first group and selects the call 105-5 of the second group for forwarding to a communication device 107. A communication device 107 for forwarding may be selected as described above; for example, the communication device 107-2 may be selected.

The automated call-answering device 101 forwards, from the automated call-answering device to the communication device 107-2 (e.g. operated by a human user, such as the dispatcher 108-2) the respective calls 105-3, 105-5 from each of the two groups as indicated by a connection 599-1 between the call 105-3 and the communication device 107-2, and by a connection 599-2 between the call 105-5 and the communication device 107-2.

While the connections 599-1, 599-2 are depicted as being via the automated call-answering device 101, the connections 599-1, 599-2 may be via any suitable network and may not be via the automated call-answering device 101. The forwarded calls 105-3, 105-5 may be queued at the communication device 107-2, and answered in any suitable order by the dispatcher 108-2, and/or the forwarded calls 105-3, 105-5 may be connected at the communication device 107-2. In some examples, the dispatcher 108-2 may operate the communication device 107-2 to answer one of the calls 105-3, 105-5, and place the other call 105-3, 105-5 on hold, and then place the answered call on hold while answering the other call 105-3, 105-5. Regardless, the dispatcher 108-2 may speak to both callers 104-3, 104-5 to determine a more accurate answer to the given question 227 that resulted in different respective answers 537.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method comprising:
answering, by an automated call-answering device, a plurality of calls associated with an incident;
asking, by the automated call-answering device, to the plurality of calls, one or more initial questions to determine that the plurality of calls are associated with a same incident at a same location;
assigning, by the automated call-answering device, to the plurality of calls, questions associated with the incident, each of the questions assigned to at least two of the plurality of calls;
asking, by the automated call-answering device, the questions on the plurality of calls, as assigned;
receiving, by the automated call-answering device, answers to the questions;
when received answers to the given question contradict each other, the given question asked on a first call and a second call of the plurality of calls, asking the given question on at least a third call of the plurality of calls;
determining a group of the plurality of calls where one or more consistent answers were received in response to a given question by comparing the text of answers to the questions asked on the calls;
selecting, by the automated call-answering device, a call to be forwarded to a communication device operated by a human user, the call selected from the group of the plurality of calls, the call further selected based on voice attributes of callers in the group of the plurality of calls; and
forwarding, from the automated call-answering device to the communication device, the call as selected.

2. The method of claim 1, wherein the questions are assigned to the plurality of calls based on associated caller attributes.

3. The method of claim 2, wherein the associated caller attributes comprise one or more of:
a name of a respective caller on the plurality of calls;
a phone number of the respective caller;
a location of the respective caller;
a time that a respective call from the respective caller was received;
a relationship of the respective caller to a person associated with the incident;
a respective voice attribute of the respective caller;
data stored at one or more memories accessible to the automated call-answering device, the data associated with the respective caller;
a skill of the respective caller; and
an expertise of the respective caller.

4. The method of claim 1, further comprising:
identifying two groups of the plurality of calls where different respective answers were received in response to the given question;
selecting a respective call from each of the two groups based on respective voice attributes of the callers on the two groups of the plurality of calls; and
forwarding, from the automated call-answering device to the communication device operated by the human user, the respective call from each of the two groups.

5. The method of claim 1, further comprising:
selecting the communication device from a plurality of communication devices operated by respective human users, based on comparing respective attributes of the respective human users to a type of the given question.

6. The method of claim 1, wherein the voice attributes of the callers of the group of the plurality of calls comprise respective frequency patterns received in the group of the plurality of calls.

7. The method of claim 1, wherein the voice attributes of the callers of the group of the plurality of calls comprise keywords detected in the group of the plurality of calls.

8. The method of claim 1, wherein the questions associated with the incident are one or more of:
predetermined; and
stored at a memory, accessible to the automated call-answering device, in association with an incident type.

9. The method of claim 1, wherein:
the automated call-answering device comprises a component of a public safety answering point (PSAP);
the communication device comprises a terminal of the PSAP; and
the human user comprises a dispatcher of the PSAP.

10. An automated call-answering device comprising:
a communication unit; and
a controller configured to:
  answer, via the communication unit, a plurality of calls associated with an incident;
  ask, via the communication unit, to the plurality of calls, one or more initial questions to determine that the plurality of calls are associated with a same incident at a same location;
  assign, to the plurality of calls, questions associated with the incident, each of the questions assigned to at least two of the plurality of calls;
  ask, via the communication unit, the questions on the plurality of calls, as assigned;
  receive, via the communication unit, answers to the questions;
  when received answers to the given question contradict each other, the given question asked on a first call and a second call of the plurality of calls, ask, via the communication unit, the given question on at least a third call of the plurality of calls;
  determine a group of the plurality of calls where one or more consistent answers were received in response to a given question by comparing the text of answers to the questions asked on the calls;
  select a call to be forwarded to a communication device operated by a human user, the call selected from the group of the plurality of calls, the call further selected based on voice attributes of callers in the group of the plurality of calls; and
  forward, via the communication unit, to the communication device, the call as selected.

11. The automated call-answering device of claim 10, wherein the questions are assigned to the plurality of calls based on associated caller attributes.

12. The automated call-answering device of claim 11, wherein the associated caller attributes comprise one or more of:
a name of a respective caller on the plurality of calls;
a phone number of the respective caller;
a location of the respective caller;
a time that a respective call from the respective caller was received;
a relationship of the respective caller to a person associated with the incident;
a respective voice attribute of the respective caller;
data stored at one or more memories accessible to the automated call-answering device, the data associated with the respective caller;
a skill of the respective caller; and
an expertise of the respective caller.

13. The automated call-answering device of claim 10, wherein the controller is further configured to:
identify two groups of the plurality of calls where different respective answers were received in response to the given question;
select a respective call from each of the two groups based on respective voice attributes of the callers on the two groups of the plurality of calls; and
forward, to the communication device operated by the human user, the respective call from each of the two groups.

14. The automated call-answering device of claim 10, wherein the controller is further configured to:
select the communication device from a plurality of communication devices operated by respective human users, based on comparing respective attributes of the respective human users to a type of the given question.

15. The automated call-answering device of claim 10, wherein the voice attributes of the callers of the group of the plurality of calls comprise respective frequency patterns received in the group of the plurality of calls.

16. The automated call-answering device of claim 10, wherein the voice attributes of the callers of the group of the plurality of calls comprise keywords detected in the group of the plurality of calls.

17. The automated call-answering device of claim 10, wherein the questions associated with the incident are one or more of:
predetermined; and
stored at a memory, accessible to the automated call-answering device, in association with an incident type.

18. The automated call-answering device of claim 10, wherein:
the automated call-answering device comprises a component of a public safety answering point (PSAP);
the communication device comprises a terminal of the PSAP; and
the human user comprises a dispatcher of the PSAP.

* * * * *